United States Patent
Deo et al.

(10) Patent No.: US 12,146,099 B2
(45) Date of Patent: Nov. 19, 2024

(54) INHIBITION OF SILICA SCALE USING A CHELATING AGENT BLENDED WITH ACID AND ALKYLENE OXIDE DERIVED POLYMER DISPERSANTS

(71) Applicants: Dow Global Technologies LLC, Midland, MI (US); Rohm and Haas Company, Collegeville, PA (US)

(72) Inventors: Puspendu Deo, Pearland, TX (US); Maria Simon, Rosharon, TX (US); Pramod Akhade, Houston, TX (US); Graham P. Abramo, Penllyn, PA (US); Kaylie L. Young, Sugar Land, TX (US); Somil Chandrakant Mehta, Mumbai (IN)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 723 days.

(21) Appl. No.: 15/734,058

(22) PCT Filed: May 29, 2019

(86) PCT No.: PCT/US2019/034349
§ 371 (c)(1),
(2) Date: Dec. 1, 2020

(87) PCT Pub. No.: WO2019/232019
PCT Pub. Date: Dec. 5, 2019

(65) Prior Publication Data
US 2021/0221723 A1    Jul. 22, 2021

(30) Foreign Application Priority Data

Jun. 1, 2018 (IN) .............................. 201841020598
Jun. 1, 2018 (IN) .............................. 201841020613

(Continued)

(51) Int. Cl.
*C09K 8/528* (2006.01)
*C02F 5/12* (2023.01)
(Continued)

(52) U.S. Cl.
CPC ................ *C09K 8/528* (2013.01); *C02F 5/12* (2013.01); *C08F 220/06* (2013.01);
(Continued)

(58) Field of Classification Search
None
See application file for complete search history.

(56) References Cited

U.S. PATENT DOCUMENTS 4,146,488 A    3/1979 Martin
4,392,972 A    7/1983 Mohr et al.
(Continued)

FOREIGN PATENT DOCUMENTS

JP    2004027060 A    1/2004

OTHER PUBLICATIONS

PCT/US2019/034349, International Search Report and Written Opinion with a mailing date of Dec. 5, 2019.
(Continued)

*Primary Examiner* — Clare M Perrin

(57) ABSTRACT

A method of inhibiting silica and silicate scale formation via treating an aqueous system containing silica with an effective amount of a chelating agent blended with a polymeric dispersant in a weight ratio range from greater than 1.0:0.5 to less than 1.0:3.0, agent to dispersant, including blends in a weight ratio of 1:1. Specifically, the chelating agent is either EDTA or DTPA, while the polymer dispersant is an acid and alkylene oxide derived dispersant.

9 Claims, 6 Drawing Sheets

(30) Foreign Application Priority Data

Aug. 6, 2018 (IN) .............................. 201841029480
Jan. 21, 2019 (IN) .............................. 201941002455

(51) Int. Cl.
*C08F 220/06* (2006.01)
*C08F 220/28* (2006.01)
*C08F 283/06* (2006.01)
*C02F 101/10* (2006.01)

(52) U.S. Cl.
CPC ........ *C08F 220/286* (2020.02); *C08F 283/06* (2013.01); *C02F 2101/10* (2013.01); *C02F 2303/22* (2013.01)

(56) References Cited

U.S. PATENT DOCUMENTS

| | | |
|---|---|---|
| 4,618,448 A | 10/1986 | Cha et al. |
| 4,711,725 A | 12/1987 | Amick et al. |
| 4,933,090 A | 6/1990 | Gill et al. |
| 5,271,847 A * | 12/1993 | Chen ................. C02F 5/105 210/698 |
| 5,378,368 A | 1/1995 | Gill |
| 5,952,432 A | 9/1999 | Yamaguchi et al. |
| 6,051,142 A | 4/2000 | Roe |
| 6,143,243 A | 11/2000 | Gershun et al. |
| 6,166,149 A * | 12/2000 | Yamaguchi ........... C08F 283/06 525/63 |
| 7,316,787 B2 | 1/2008 | Hendel et al. |
| 7,960,455 B2 * | 6/2011 | Nied ..................... C02F 1/68 210/698 |
| 2011/0049053 A1 | 3/2011 | Hirsch |
| 2011/0114564 A1 * | 5/2011 | Amjad ..................... C02F 5/14 210/698 |
| 2015/0076074 A1 * | 3/2015 | Mehta ..................... C02F 5/14 210/698 |
| 2017/0190603 A1 | 7/2017 | Mehta et al. |

OTHER PUBLICATIONS

PCT/US2019/034349, International Preliminary Report on Patentability with a mailing date of Dec. 1, 2020.

Office action from corresponding 11202011971R Singapore application with a mailing date of May 15, 2023.

* cited by examiner

INHIBITION OF SILICA SCALE USING A CHELATING AGENT BLENDED WITH ACID AND ALKYLENE OXIDE DERIVED POLYMER DISPERSANTS

CROSS-REFERENCE

This International Patent application claims priority to Indian Patent Application No. 201841029480, filed Aug. 6, 2018; Indian Patent Application No. 201841020598, filed Jun. 1, 2018; Indian Patent Application No. 201841020613, filed Jun. 1, 2018; and Indian Patent Application No. 201941002455, filed Jan. 21, 2019.

FIELD OF THE INVENTION

This invention relates to scale inhibition. Specifically, this invention relates to the use of a blend of chelating agents such as ethylenediaminetetraacetic acid (EDTA) or diethylene triamine pentaacetic acid (DTPA) with acid and alkylene oxide derived polymer dispersants such as acid grafted EO-PO copolymers or bottle brush polymers to inhibit the formation of silica scales.

BACKGROUND OF THE INVENTION

Silica and metal silicate scales are problematic in many industries utilizing aqueous systems. The segments most impacted are industrial water treating, specifically reverse osmosis (RO), cooling towers, boilers, and oil and gas applications, in particular geothermal energy harvesting and steam assisted gravity drainage (SAGD) applications. Mining operations, such as alumina refining utilizing the Bayer process, also have significant issues with silica and silicate scales.

Silica and silicate scale formation is dependent on operating conditions such as pH, temperature, silica concentration, and the presence of polyvalent metal ions present in the water used in such systems. Based on those conditions, different types of silica or silicate scales may form. For example, at pH values above 8.5, silica scale is predominantly in the form of metal silicates, depending on the presence of multivalent ions such as $Mg^{2+}$, $Ca^{2+}$, $Al^{3+}$, or $Fe^{3+}$ and operation temperature, whereas colloidal silica (polymerized silica particles) is more common at pH values between 6.5 and 8.5. The scales can deposit on the water treatment or production equipment and ultimately restrict flow, leading to costly process downtime. Typical scale removal treatments involve mechanical cleaning or hazardous and corrosive acid washes, such as hydrofluoric acid washes.

Scale inhibitors known in the art include, for example, U.S. Published Patent Application No. 2015/0076074, which discloses the use of a blend of homo-polymers of acrylic acid (AA) with either copolymers of AA and 2-acrylamido-2-methylpropane sulfonic acid (AMPS), or terpolymers of AA, AMPS, and t-Butylacrylamide (t-BAM) with EDTA to control silica and silicate scales in cooling and boiler water systems. U.S. Pat. No. 6,166,149 discloses a process for making a scale inhibitor comprising a hydrophilic graft polymer and polyether compound that optionally further comprises an unsaturated carboxylic acid type polymer. U.S. Pat. No. 5,378,368 discloses the use of polyether polyamino methylene phosphonates to control silica/silicate deposition that may be used alone or in combination with a polymer additive. U.S. Pat. No. 4,618,448 discloses the use of a carboxylic/sulphonic/polyalkylene oxide polymer as a scale inhibitor, while U.S. Pat. No. 4,933,090 discloses the use of a select phosphonate and optionally a carboxylic/sulphonic/polyalkylene oxide polymer to control silica/silicate deposition. Separately, U.S. Pat. No. 6,051,142 discloses the use of ethylene oxide-propylene oxide (EO-PO) block copolymers to control silica and silicate scales in cooling and boiler water systems. Finally U.S. Pat. No. 7,316,787 discloses the use of hydrophobically modified ethylene oxide polymers as colloidal silica scale inhibitors.

Despite the existence of multiple scale inhibitors, silica and metal silicate scaling continue to be major challenges in aqueous systems. In particular, while inhibitors are effective in inhibiting silica scale formation in pure silica brine conditions, such inhibitors lose their efficacy in the presence of multivalent cations that are found in many industrial applications. What is needed is a silica and metal silicate scale inhibitor that maintains its efficacy in the presence of brines comprising such multivalent cations.

SUMMARY OF THE INVENTION

In accordance with one aspect of the invention, there is provided a method of inhibiting silica and metal silicate scale formation via treating an aqueous system containing silica with an effective amount of a chelating agent blended with an alkylene oxide derived polymer dispersant. The chelating agent is blended with the polymer dispersant in a weight ratio range from greater than 1.0:0.5 to less than 1.0:3.0, agent to dispersant, including blends in a weight ratio of 1:1. Preferably, the chelating agent is either EDTA or DTPA. It has been found that when the polymer dispersants are blended with EDTA or DTPA in the above weight ratio, the resulting blend exhibits a synergistic effect on the inhibition of colloidal silica or metal silicate formation in brine, including in the presence of multivalent cations.

DETAILED DESCRIPTION OF THE PREFERRED EMBODIMENTS

Figure 1:
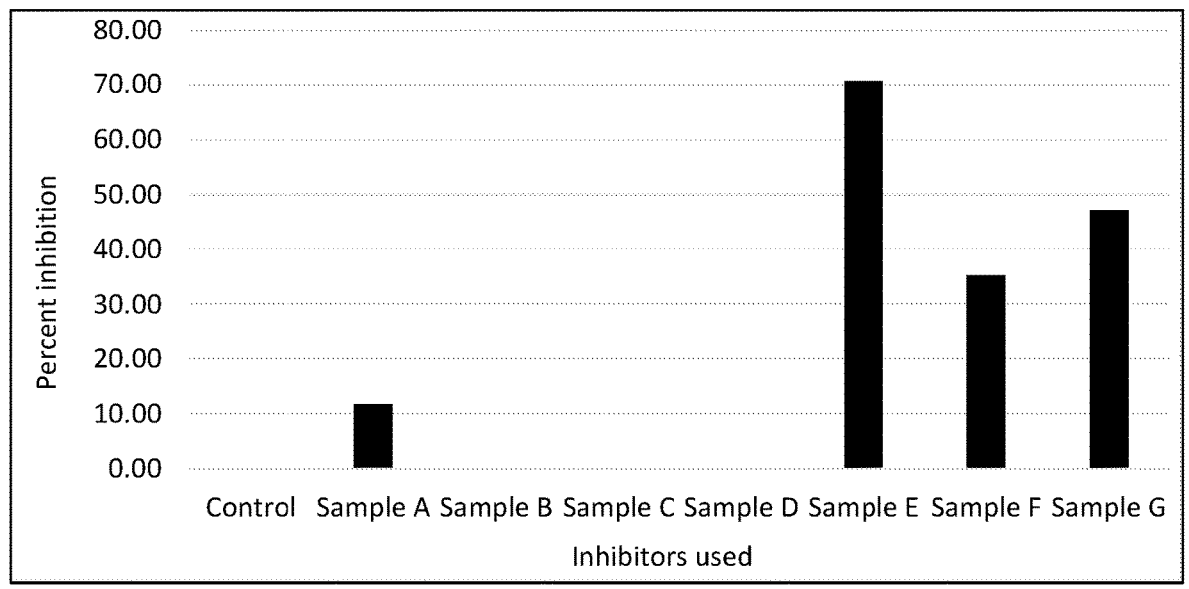
FIG. 1 is a chart depicting percent inhibition of a control and scale inhibitors Sample A through Sample G for 400 ppm silica in presence of $Na^+$, $K^+$, $Ca^{2+}$, $Mg^{2+}$, and $Al^{3+}$.

The disclosed invention covers a method of inhibiting silica and metal silicate scale formation via treating an aqueous system containing silica with an effective amount of a chelating agent blended with an alkylene oxide derived polymer dispersant. The chelating agent is blended with the polymer dispersant in a weight ratio range from greater than 1.0:0.5 to less than 1.0:3.0, agent to dispersant, including blends in a weight ratio of 1:1. It has been found that when the polymer dispersants are blended with the chelating agent in the above weight ratios, the resulting blend exhibits a synergistic effect on the inhibition of colloidal silica or silicate formation in brine, including in the presence of multivalent cations.

All percentages stated herein are weight percentages (wt. %), unless otherwise indicated. Temperatures are in degrees Celsius (C), and "ambient temperature" means between 20° C. and 25° C., unless specified otherwise.

"Polymer" generally refers to a polymeric compound or "resin" prepared by polymerizing monomers, whether of the same or different types. As used herein, the generic term "polymer" includes polymeric compounds made from one or more types of monomers. "Copolymers" as used herein generally refers to polymeric compounds prepared from two or more different types of monomers. Similarly "terpolymers" are polymeric compounds prepared from three different types of monomers.

"Aqueous system" generally refers to any system containing water including, but not limited to, silica brine, cooling water, desalination, filtration, reverse osmosis, sugar evaporators, paper processing, mining circuits, geothermal energy systems, SAGD, and the like.

The term "silica scale" generally refers to solid materials containing silica that are deposited and accumulated on internal surfaces of water treatment equipment such as RO membranes, heat exchangers, and production tubing and piping. Silica scale generally includes multiple types of silica scale such as colloidal or amorphous silica ($SiO_2$) and silicate (such as magnesium silicate). The accumulated silica scale may be, and sometimes is, a combination of silica and silicate types of scale, often where one or the other type of scale predominates. Colloidal/amorphous silica scale is the term used hereinafter to generally refer to silica scale deposits that are predominantly of the colloidal/amorphous type. Other kinds of scale besides the silica types may be present, such as calcium carbonate, calcium sulfate, calcium phosphate, calcium phosphonate, calcium oxalate, barium sulfate, alluvial deposits, metal oxide, and metal hydroxide, depending upon what kinds of metals and other ions are present in the aqueous system.

The chemical reaction mechanism for formation of colloidal/amorphous silica scale generally involves condensation polymerization of silicic acid, catalyzed by hydroxide ions. This reaction mechanism proceeds generally as follows:

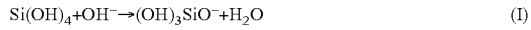

$$Si(OH)_4 + OH^- \rightarrow (OH)_3SiO^- + H_2O \quad (I)$$

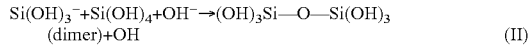

$$Si(OH)_3^- + Si(OH)_4 + OH^- \rightarrow (OH)_3Si-O-Si(OH)_3 \text{ (dimer)} + OH \quad (II)$$

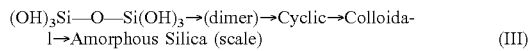

$$(OH)_3Si-O-Si(OH)_3 \rightarrow (dimer) \rightarrow Cyclic \rightarrow Colloidal \rightarrow Amorphous\ Silica\ (scale) \quad (III)$$

Since the reaction mechanism is catalyzed by hydroxide ions, it proceeds slowly at low pH, but increases significantly above pH of about 7. Thus, prevention of silica scale formation in aqueous systems having "neutral" pH, such as, between 6.5 and 8.5, is of particular concern.

The method of the present invention is suitable for controlling deposition of colloidal/amorphous silica scale in aqueous systems having a pH between 6.0 and 10.0, at temperatures ranging from 20° C. to 250° C. The method comprises treating an aqueous system containing silica with an effective amount of a chelating agent blended with a polymeric dispersant in a weight ratio range from greater than 1.0:0.5 to less than 1.0:3.0. Specifically, the chelating agent is either EDTA or DTPA, while the polymer dispersant is either an acid grafted EO-PO copolymer, or a bottle brush polymer polymerized from anionic monomers and polyoxoalkylene-containing monomers.

Chelating Agent

A chelating agent is a substance whose molecules can form several bonds to a single metal ion. Chelating agents are therefore often utilized for removing unwanted metal ions from a system. It has been determined that useful chelating agents for the present invention are EDTA and DTPA. EDTA's usefulness comes from its role in forming hexadentate ("six-toothed") ligands, which act as superior chelating agents for multivalent cations, in particular sequestering metal ions such as $Ca^{2+}$, $Mg^{2+}$, $Fe^{3+}$ and $Al^{3+}$. Similarly DTPA's usefulness comes from its role in forming octadentate ligands, which are also superior chelating agents for multivalent cations such as $Ca^{2+}$, $Mg^{2+}$, $Fe^{3+}$ and $Al^{3+}$.

Polymer Dispersant

The polymer dispersant is an acid and alkylene oxide derived dispersant. The polymer dispersant may be a liquid dispersing agent. The polymer dispersant has a number average molecular weight from 500 Daltons to 40,000 Daltons (e.g., from 2,000 Daltons to 20,000 Daltons, from 2,000 Daltons to 15,000 Daltons, from 2,000 Daltons to 13,000 Daltons, 2,500 Daltons to 12,000 Daltons, etc.).

Graft Polymer Dispersant

Graft polymers are segmented copolymers comprising (1) a linear backbone polymer and (2) randomly distributed branches of another polymer.

The poly(alkylene oxide) compounds used to make the graft copolymers are commonly produced by reacting an alkylene oxide or a mixture of alkylene oxides, added sequentially or in combination, with an alcohol. Such alcohols can be monohydric or polyhydric and correspond to the formula $R''(OH)_a$, wherein $R''$ is hydrogen, or methyl, ethyl, or amine groups, and "a" has a value of from 1 to 4. Such alcohols include methanol, ethanol, propanol, butanol, ethylene glycol, glycerol, the monoethylether of glycerol, the dimethyl ether of glycerol, sorbitol, 1,2,6-hexanetriol, trimethylolpropane, and the like.

Generally, the poly(oxyalkylene) compounds used in this invention have molecular weights (number average) in the range of about 200 Daltons to about 80,000 Daltons, preferably from about 1,000 Daltons to about 50,000 Daltons, more preferably from about 1,500 Daltons to about 20,000 Daltons, even more preferably from about 2,000 Daltons to about 10,000 Daltons, even further more preferably from about 3,000 Daltons to about 7,000 Daltons, and most preferably from about 4,500 Daltons to about 5,500 Daltons.

The grafting of the polymerizable-acid onto the poly(oxyalkylene) compounds can be carried out by free radical polymerization, to afford a grafted acid content of between about 3 and about 35 (preferably between about 5 and about 25).

Useful grafting acids include, among others, acrylic acid, methacrylic acid, itaconic acid, maleic acid, 2-acrylamido-2-methylpropylsulfonic acid (AMPS), 2-methacrylamido-2-methylpropylsulfonic acid, styrene sulfonic acid, vinylsulfonic acid, ethylene glycol methacrylate phosphate, and vinyl phosphonic acid, with acrylic acid, maleic acid and vinyl phosphonic acid being more preferable, and acrylic acid being most preferable.

The poly(oxyalkylene) compounds useful in the present invention have the formula:

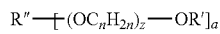

$$R''\text{---}[(OC_nH_{2n})_z\text{---}OR']_a$$

wherein each R' is independently either hydrogen or a methyl, ethyl, or amine group; R" is independently either hydrogen or a methyl, ethyl, or amine group; each "n" has, independently, a value of from 2 to 4; each "Z" has, independently, a value of from 4 to about 1800; and "a" has a value of from 1 to 4. In a preferred embodiment, the poly(oxyalkylene) compounds are monohydric alcohol-initiated poly(oxyethylene-oxypropylene) polymers with "n" having a value of 2 or 3; "a" having a value of 1; and each R' or R" being independently either hydrogen or a methyl, ethyl, or amine group, resulting in an ethylene oxide ("EO") and propylene oxide ("PO") copolymer ("EO-PO copolymer"). In another preferred embodiment, R' and R" are not both a hydrogen atom.

Poly(oxyethylene-oxypropylene) or EO-PO copolymers are particularly suited as a backbone for the graft polymers of the present invention, as they are capable of inhibiting the formation of silica scales. Suitable EO-PO copolymers of the present invention may comprise random copolymers of EO-PO, block copolymers of EO-PO, and reverse block copolymers of EO -PO. The weight ratio of EO:PO can be from about 99:1 to about 1:99, and is preferably from about 90:10 to about 10:90, and is more preferably from about 75:25 to about 25:75, and is even more preferably from about 45:55 to about 55:45, and most preferably about 50:50. The graft polymer of the present invention preferably comprises 65 wt. % to 97 wt. % of backbone polymer.

Bottle Brush Polymer Dispersant

Bottle brush polymers are a type of branched or graft polymer comprising two or more polymers, with polymeric side-chain "bristles" attached to a linear polymer "backbone," such that their appearance resembles that of a bottle brush. Bottle brush polymers desirable for the present invention comprise polymer side-chains A, backbone B, and optionally side-chains C, wherein A is the repeat unit obtained after polymerization of one or more anionic monomers, B is the repeat unit obtained after polymerization of one or more polyoxoalkylene-containing monomers, and C is the repeat unit obtained after polymerization of one or more anionic or nonionic monomers.

A preferably comprises approximately 5 wt. % to approximately 45 wt. % of the bottle brush polymer. More preferably, A comprises approximately 5 wt. % to approximately 30 wt. % of the bottle brush polymer. Most preferably, A comprises approximately 5 wt. % to approximately 20 wt. % of the bottle brush polymer.

B preferably comprises approximately 55 wt. % to approximately 95% of the bottle brush polymer. More preferably B comprises approximately 70 wt. % to approximately 95 wt. % of the bottle brush polymer. Most preferably, B comprises approximately 70 wt. % to approximately 85 wt. % of the bottle brush polymer.

Finally, C preferably comprises approximately 0 wt. % to approximately 25 wt. % of the bottle brush polymer. More preferably C comprises approximately 0 wt. % to approximately 15 wt. % of the bottle brush polymer. Most preferably C comprises approximately 0 wt. % to approximately 10 wt. % of the bottle brush polymer.

Preferably the bottle brush polymers of the present invention have a number average molecular weight of approximately 2,000 Daltons to approximately 60,000 Daltons, and more preferably 4,000 Daltons to 20,000 Daltons.

Polyoxoalkylene-Containing Monomers

The repeat unit obtained after polymerization of polyoxoalkylene-containing monomers suitable for the present invention has the following chemical formula:

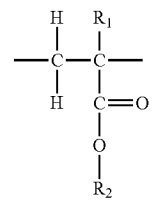

wherein $R_1$ is H or $CH_3$;
wherein $R_2$ has the chemical formula:

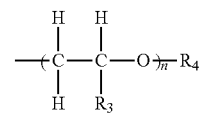

wherein $R_3$ is H, $CH_3$, or mixtures thereof;
wherein $R_4$ is H, or a $C_1$ through $C_4$ alkyl group, or mixtures thereof; and
wherein n=5-100.

The subscript "n" is preferably greater than 40 and less than or equal to 100, more preferably greater than 60 and less than or equal to 100, and most preferably greater than 80 and less than or equal to 100. Suitable polyoxoalkylene-containing monomers include, but are not limited to polyoxoalkylene acrylates and methacrylates such as polyethylene glycol methacrylate, polyethylene glycol acrylate, polyethylene glycol methyl ether methacrylate, and polyethylene glycol methyl ether acrylate. In a preferred embodiment, the polyoxoalkylene-containing monomer is polyethylene glycol methyl ether methacrylate, with a number average molecular weight of approximately 2,000 Daltons. In another preferred embodiment the polyethylene glycol methyl ether methacrylate has a number average molecular weight of approximately 550 Daltons.

Anionic Monomers

Anionic monomers act as dispersants in the presence of the typical cations found in aqueous solutions such as calcium, magnesium, iron, and aluminum. Preferred anionic monomers that may be used to synthesize the present bottle brush polymer include but are not limited to unsaturated carboxylic acids, unsaturated sulfonic acids, unsaturated phosphonic acids, unsaturated phosphates, and unsaturated acrylic phosphates. Preferred unsaturated carboxylic acids include but are not limited to acrylic acid, methacrylic acid, itaconic acid, and maleic acid. Preferred unsaturated sulfonic acids or salts include but are not limited to 2-acrylamido-2-methylpropyl sulfonic acid (AMPS), 2-methacrylamido-2-methylpropyl sulfonic acid, styrene sulfonic acid, and vinylsulfonic acid. Preferred unsaturated acrylic phosphates include but are not limited to ethylene glycol methacrylate phosphate.

Nonionic Monomers

Preferred nonionic monomers that may be used to synthesize the present bottle brush polymer include but are not limited to methacrylates, acrylates, and acrylamides. Preferred methacrylates include but are not limited to methyl methacrylate, N,N-dimethylaminoethyl (meth)acrylate, and hydroxy ethyl methacrylate. Preferred acrylates include ethyl acrylate, hydroxy propyl acrylate and cellosolve acrylate. Preferred acrylamides include (meth)acrylamide, N-methyl acrylamide, N,N-dimethylacrylamide, N-isopropyl acrylamide, N-t-butyl acrylamide, t-butyl acrylamide, t-octyl acrylamide and dimethylacrylamide.

Method of Use

"Effective amount" is that amount of the bottle brush polymer necessary to inhibit deposition of colloidal/amorphous silica scale in the aqueous system being treated. "Inhibit" means to retard the deposition of colloidal/amorphous silica scale to prolong period of maximal efficiency of equipment. The effective amount of graft copolymer or bottle brush polymer added to the aqueous system may vary depending upon the temperature and pH of the aqueous system along with the concentration of silica, salts and polyvalent metal ions present in the aqueous system. In most applications, the effective amount of graft copolymer or bottle brush polymer ranges from about 0.5 ppm to about 1,000 ppm, and more preferably from about 1 ppm to 100 ppm.

The method of polymerization employed to prepare the graft polymers useful in the method of the present invention for controlling deposition is not particularly limited and may be any method known, now or in the future, to persons of ordinary skill including, but not limited to, emulsion, solution, addition and free-radical polymerization techniques, including the methods disclosed in U.S. Pat. Nos. 4,146,488, 4,392,972, 5,952,432, and 6,143,243, which are hereby incorporated by reference.

The method of polymerization employed to prepare the bottle brush polymers useful in the method of the present invention for controlling deposition is not particularly limited and may be any method known, now or in the future, to persons of ordinary skill including, but not limited to, emulsion, solution, addition and free-radical polymerization techniques, including the methods of polymerization disclosed in U.S. Pat. No. 4,711,725, which is hereby incorporated by reference in its entirety. Preferably, the bottle brush polymer of the present invention is polymerized via aqueous solution free radical polymerization.

The EDTA or DTPA and polymers can be dosed separately at the ratios described above or can first be pre-blended together at the ratios described above and then dosed together. Blending is continued until the chelating agent and polymer dispersants are homogeneous.

The use, application and benefits of the present invention will be clarified by the following discussion and description of exemplary embodiments of the present invention.

WORKING EXAMPLES

The following Examples illustrate various nonlimiting embodiments of the invention disclosed and claimed herein as well as certain attributes thereof.

An investigation was conducted as to the silica scale inhibiting properties of the following:

Sample A: 50 wt. % EO-50 wt. % PO, based on total weight of alkylene oxides in the backbone, with 10% of the repeat units (i.e. monomers) of the backbone grafted with Acrylic acid (AA), and having a number average molecular weight of 2,700 Daltons;

Sample B: 8.7 wt. % AA (acrylic acid)-8.7 wt. % MAA (methacrylic acid)-82.6 wt. % MPEGMA 2000 (poly-ethylene glycol methyl ether methacrylate) terpolymer, having a number average molecular weight of 11,000 Daltons;

Sample C: 7 wt. % methacrylic acid (MAA)-21 wt. % methyl methacrylate (MMA)-72 wt. % MPEGMA-550 (polyethylene glycol methyl ether methacrylate), having a number average molecular weight of 4,300 Daltons;

Sample D: EDTA;

Sample E: Sample D blended with Sample A in a 1:1 weight ratio;

Sample F: Sample D blended with Sample B in a 1:1 weight ratio;

Sample G: Sample D blended with Sample C in a 1:1 weight ratio;

Sample H: Sample D blended with Sample A in a 1:2 weight ratio; and

Sample I: Sample D blended with Sample A in a 1:3 weight ratio.

Preparation of Sample A

The acrylic acid grafted EO-PO copolymer was prepared using acrylic acid and a base polymer containing butanol-initiated poly(oxyethylene-oxypropylene) copolymer as follows:

Into a 5-liter, 3-neck round bottom flask fitted with a water condenser, thermocouple, stirrer, and means of introducing acrylic acid and catalyst, was placed 2,700 g of the base polymer. By means of a heating mantle, the flask was heated to a temperature of 150° C., followed by the addition of 35 g of tertiary-butyl perbenzoate and 312 g of acrylic acid. A peroxide feed was begun 10 minutes prior to starting the acid feed and both ingredients were fed over a period of 90 minutes after which the product was allowed to cool to room temperature.

Preparation of Sample B

Water, sodium metabisulfite, and iron sulfate heptahydrate were added to a glass reactor and heated to 72° C. under a nitrogen atmosphere. Sodium metabisulfite, sodium persulfate, and the monomer mix containing water, acrylic acid, and polyethylene glycol methyl ether methacrylate were added to the reactor over 120 minutes. A second charge of sodium persulfate was added to the reactor after the completion of monomer feeds and held for 5 minutes at 60° C. 50% sodium hydroxide solution in water was added slowly to the reactor to partially neutralize the polymer and afford a polymer solution that was 35% solids.

Preparation of Sample C

Propylene Glycol (354 g) was added to a 3 liter, 4 necked round bottom glass reactor fitted with a stirrer, a thermocouple, N2 inlet, and a reflux condenser. The contents of the reactor were heated to 92° C. under a nitrogen atmosphere while stirring. A solution of sodium phosphate dibasic (2.46 g) dissolved in deionized water (10 g) was added to the reactor followed by mercaptoethanol (6.6 g). A monomer mix containing Bisomer 550 MW (470.3 g), methyl methacrylate (138.7 g), and methacrylic acid (45.5 g) was added to the reactor over 240 minutes. An initiator feed of Trigonox 25 C75 (89.6) dissolved in propylene glycol (90 g) was added to the reactor starting at the same time as the monomer mixture and fed over 250 minutes. During feeds the reactor temperature was controlled at 91° C. while continuing stirring. After the completion of initiator feeds the batch was held at 90° C. for 20 minutes. A mixture of ammonium hydroxide solution in water (16.5 g, 30%) and deionized water (285 g) was added to the reactor to raise the pH to 7.0. A solution of Trigonox 25 C75 (52.8 g) in deionized water (53 g) was added to the reactor. A solution of Sodium Metabisulfite (23.6 g) in deionized water (70 g) was added to the reactor, and the batch was held at 90° C. for 45 minutes. A final dilution of deionized water (175 g) was added to the batch, and the batch was cooled to room temperature and collected.

Preparation of Samples E-I

The EDTA solution was blended with solutions of Samples A-C in a 1:1 ratio and mixed until the EDTA and polymer dispersant were homogeneous. Separately EDTA was blended with sample A in a 1:2 ratio and a 1:3 ratio. The pH of the blends were then adjusted to 7.5.

Scale Inhibition Static Bottle Test

Samples A through I were evaluated in 400 ppm silica solution for inhibition effectiveness. The evaluations were done at 25 ppm (12.5 ppm of each component for the blend) and 50 ppm (25 ppm of each component for the blend) of the scale inhibitor (based on % actives) against 400 ppm silica. The scale inhibitors and their blends were evaluated for ambient temperature as well as high temperature (~200° C.) applications. For high temperature applications, the inhibitors were aged at 200° C. for 24 hours in a Parr vessel and were evaluated after ageing.

Static bottle testing was used to evaluate the efficacy of various polymers to inhibit silica polymerization. Free silica remaining in solution (reactive silica) was tracked using the HACH silicomolybdate colorimetric method. Polymers with higher efficacy at inhibiting colloidal silica formation maintained higher levels of free silica in solution over time. Supersaturated silica solutions were prepared by dissolving sodium silicate salt in deionized water to yield an initial silica concentration of 400 ppm as $SiO_2$.

All experiments were performed in plastic containers to prevent silica leeching from glassware. The test solution was prepared by adding 5000 ppm of $Na^+$, added as sodium chloride, 300 ppm of $K^+$, added as potassium chloride, 100 ppm of $Ca^{2+}$, added as calcium chloride dihydrate, 40 ppm of $Mg^{2+}$, added as magnesium chloride hexahydrate, and 10 ppm of $Al^{3+}$, added as aluminum nitrate nonahydrate as a cation solution to mimic geothermal brine conditions. The silica solution was prepared by adding 400 ppm $SiO_2$, added as sodium silicate as an anion solution. A desired amount of the inhibitor stock solution was added to the anion solution and then the cation solution was added to the mixture. The pH of the complete brine was then adjusted to 7.5 via the addition of diluted hydrochloric acid and/or sodium hydroxide solution, and allowed to sit on the benchtop at room temperature for 24 hours. The silica solution was then filtered through a 0.45 μm filter and the free silica concentration of the filtrate was analyzed either by using the HACH colorimetric silico-molybdate test described below.

Determination of Soluble (Reactive) Silica:

The silico-molybdato spectrophotometric method was used to determine the soluble silica content. This method is based on the principle that ammonium molybdate forms yellow heteropolyacids with reactive silica present in the solution at low pH (~1). Since this method is only capable of determining soluble silica in the range of 1 to 100 ppm, dilution of the test solutions (with silica contents of 400-600 ppm) was necessary. The chemicals used for this test are commercially available from the HACH Company.

The inhibition performance of scale inhibitors are illustrated in two different formats: (1) Reactive silica in solution; and (2) Percent inhibition compared to control. Percent Inhibition was calculated according to the following formula:

$$\frac{\text{Final silica concentration with inhibitor} - \text{Final silica concentration without inhibitor}}{\text{Initial silica concentration} - \text{Final silica concentration without inhibitor}} * 100$$

Figure 2:
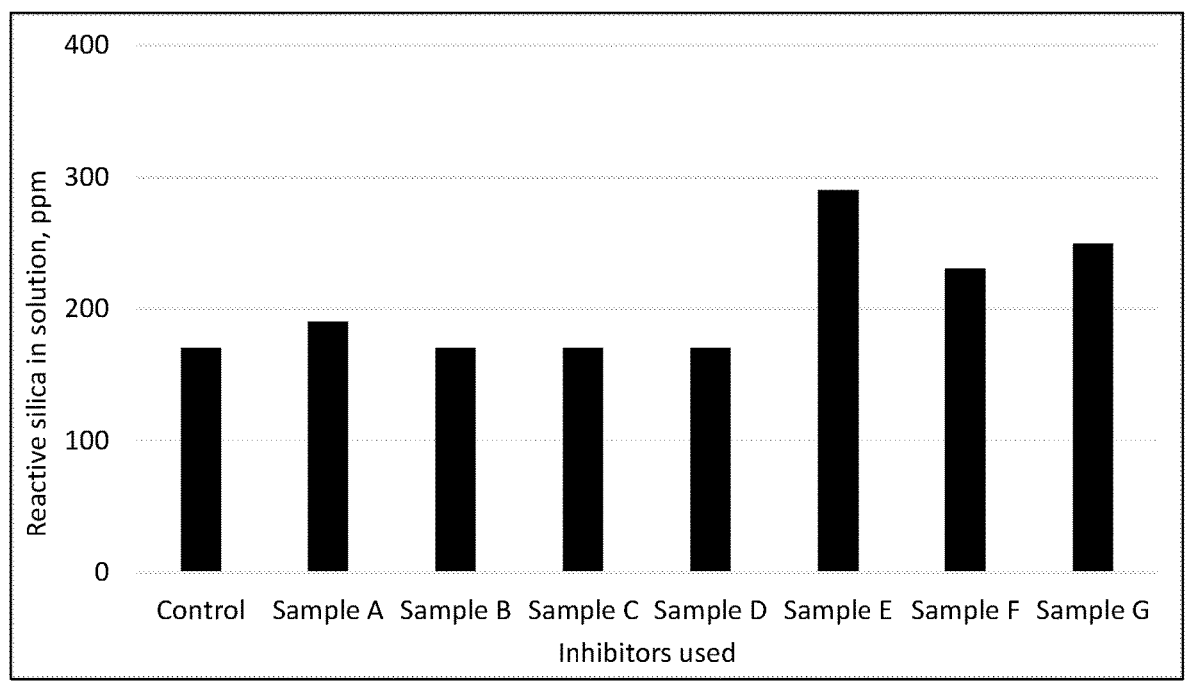
FIG. 2 is a chart depicting reactive silica in solution using a control and scale inhibitors Sample A through Sample G for 400 ppm silica in presence of $Na^+$, $K^+$, $Ca^{2+}$, $Mg^{2+}$, and $Al^{3+}$.
Figure 3:
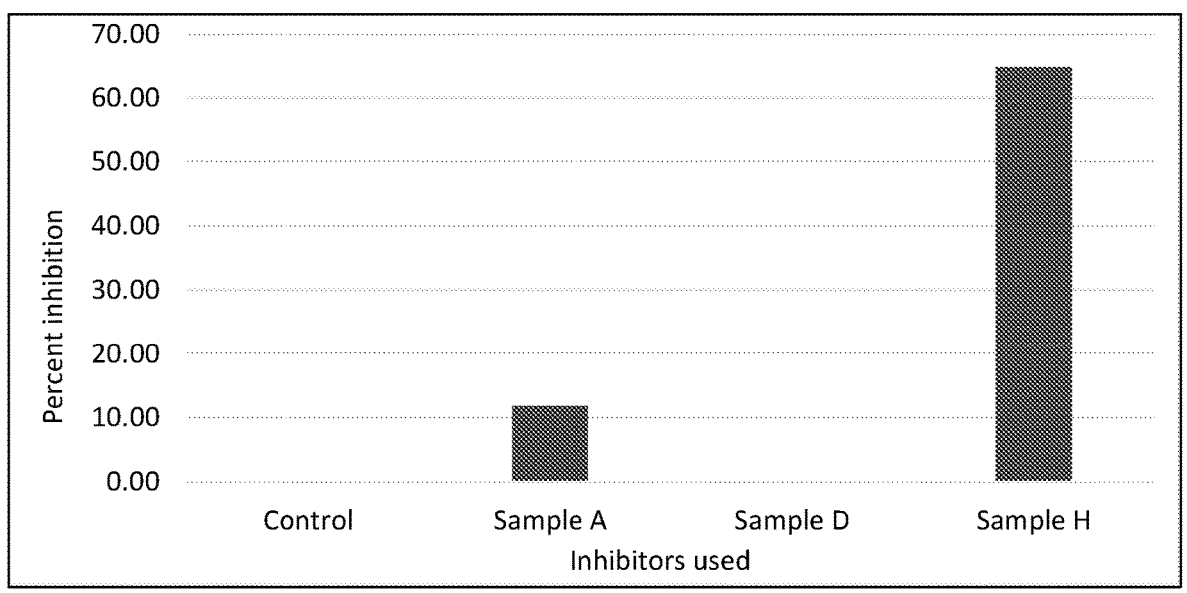
FIG. 3 is a chart depicting percent inhibition of a control and scale inhibitors Sample A, Sample D, and Sample H for 400 ppm silica in presence of $Na^+$, $K^+$, $Ca^{2+}$, $Mg^{2+}$, and $Al^{3+}$.
Figure 4:
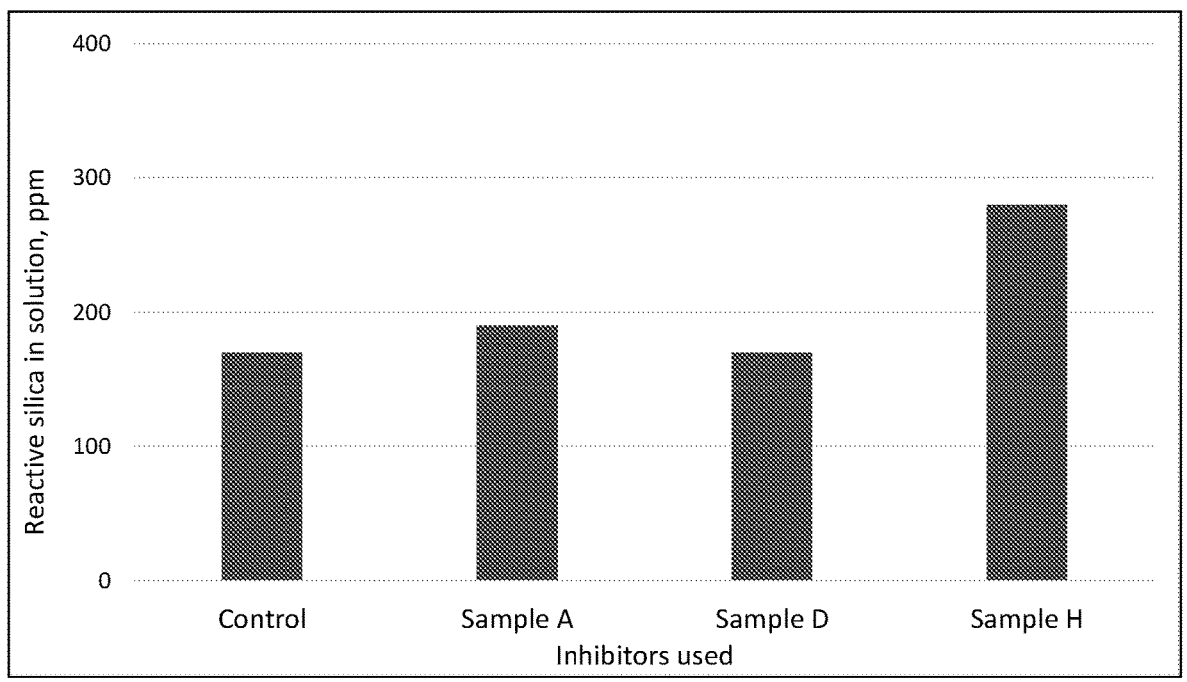
FIG. 4 is a chart depicting reactive silica in solution using a control and scale inhibitors Sample A, Sample D, and Sample H for 400 ppm silica in presence of $Na^+$, $K^+$, $Ca^{2+}$, $Mg^{2+}$, and $Al^{3+}$.
Figure 5:
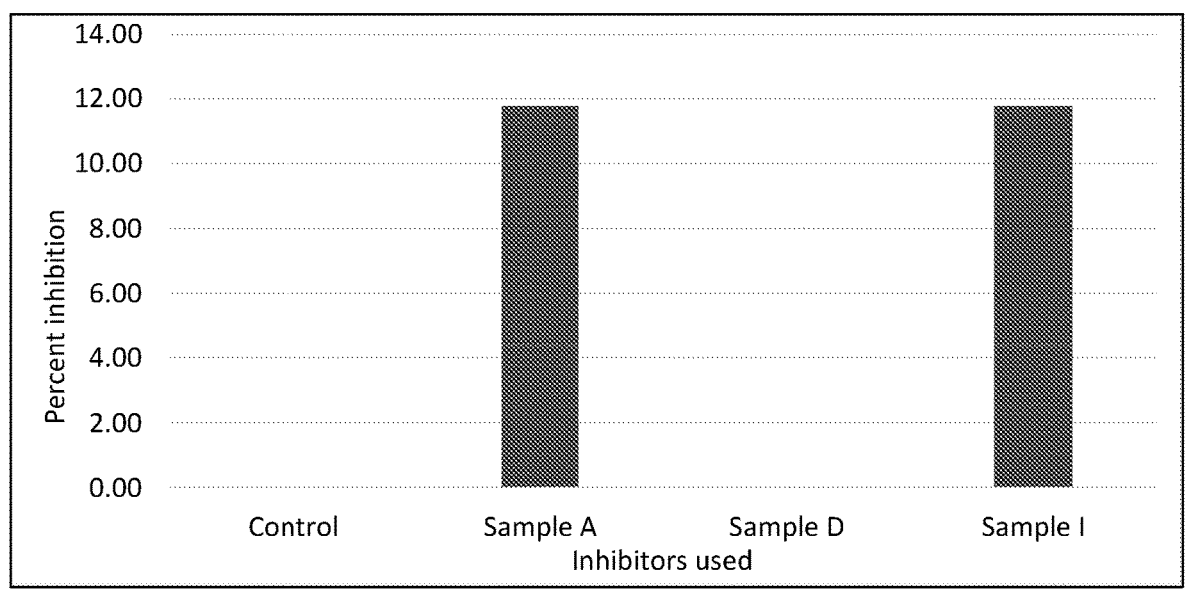
FIG. 5 is a chart depicting percent inhibition of a control and scale inhibitors Sample A, Sample D, and Sample I for 400 ppm silica in presence of $Na^+$, $K^+$, $Ca^{2+}$, $Mg^{2+}$, and $Al^{3+}$.
Figure 6:
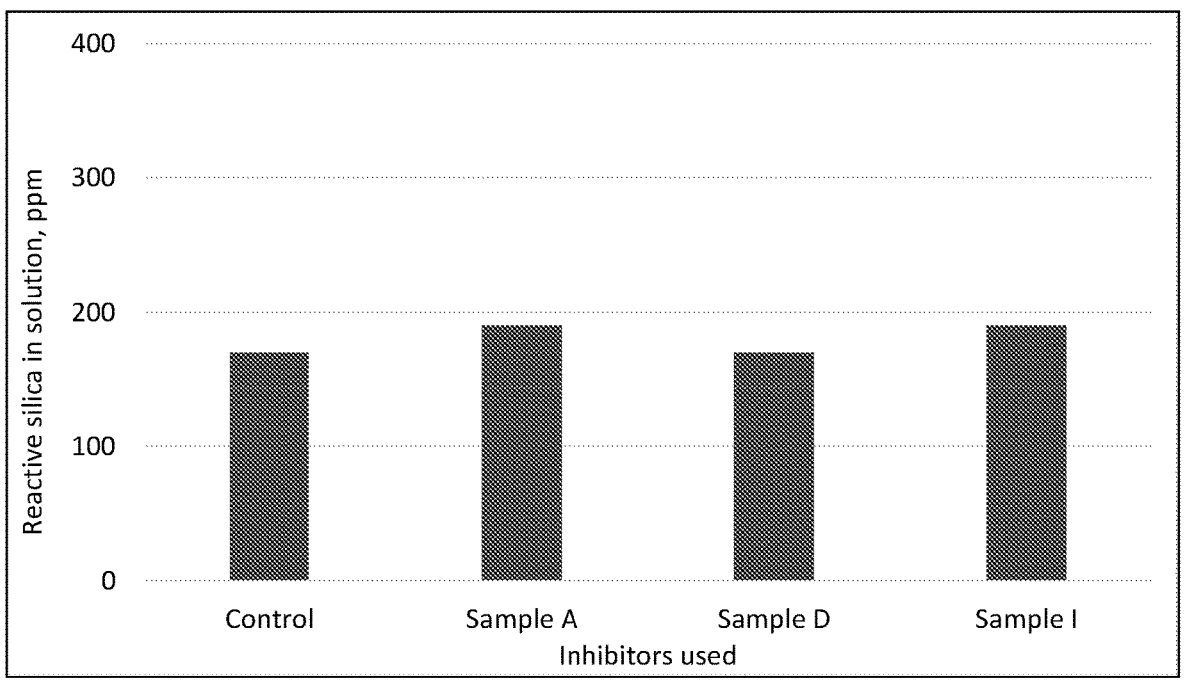
FIG. 6 is a chart depicting reactive silica in solution using a control and scale inhibitors Sample A, Sample D, and Sample I for 400 ppm silica in presence of $Na^+$, $K^+$, $Ca^{2+}$, $Mg^{2+}$, and $Al^{3+}$.

The silica scale inhibition (percent inhibition as well as reactive in silica in solution) performance of unaged scale inhibitors and their blends are illustrated in FIGS. 1-6.

As FIGS. 1-6 show, individual inhibitors (50 ppm active basis) were not effective in inhibiting silica scale (initial silica concentration 400 ppm) in the presence of cations such as K, Na, Mg, Ca and Al. In contrast, the 1:1 and 1:2 blends of EDTA (sample D) with the inhibitors exhibited significant improvement in silica inhibition performance. The 1:1 blends of EDTA with samples A, B, and C (i.e. Samples E, F, and G) and the 1:2 blend of EDTA with Sample A (i.e. Sample H) show at least 35% improvement in the scale inhibition to around 70% maximum scale inhibition compared to controls or individual scale inhibitors. However, the 1:3 blend of EDTA with Sample A (i.e. Sample I) showed negligible improvement over the control. These results show that there the combination of chelating agent and polymer dispersant in 1:1 and 1:2 ratios (agent to dispersant) provide a synergistic effect in silica scale inhibition.

Although the invention has been described by reference to its preferred embodiment as is disclosed in the specification and drawings above, many more embodiments of the invention are possible without departing from the invention. Thus, the scope of the invention should be limited only by the appended claims.

What is claimed is:

1. A method of inhibiting silica and metal silicate scale formation, said method comprising the steps of:
   treating an aqueous system comprising silica and at least one metal ion selected from the group consisting of $Fe^{3+}$ and $Al^{3+}$, with an effective amount of a mixture of a chelating agent and an acid and alkylene oxide derived polymer dispersant which is a polymerizable-acid graft polymer comprising from 5% to 25% by weight of an unsaturated grafting acid and an alkylene oxide polymer backbone;
   wherein said chelating agent is ethylenediaminetetraacetic acid (EDTA) or diethylene triamine pentaacetic acid (DTPA);
   wherein said acid and alkylene oxide derived polymer dispersant has a number average molecular weight from 500 Daltons to 40,000 Daltons; and
   wherein said chelating agent is mixed with said acid and alkylene oxide derived polymer dispersant in a weight ratio from greater than 1.0:3.0 to less than 1.0:0.5, agent to dispersant.

2. The method of claim 1, wherein said alkylene oxide polymer backbone has the following formula:

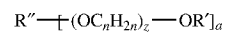

wherein each R' is independently selected from the group consisting of hydrogen, a methyl group, an ethyl group, and an amine groups;

wherein R" is independently selected from the group consisting of hydrogen, a methyl group, an ethyl group, and an amine group;

wherein each "Z" has, independently, a value of from 4 to about 1,800;

wherein "a" has a value of from 1 to 4; and wherein each "n" has, independently, a value of from 2 to 4, such that said alkylene oxide polymer backbone comprises either ethylene oxide repeat units, propylene oxide repeat units, butylene oxide repeat units, or copolymers thereof.

3. The method of claim 2, wherein said grafting acid is selected from the group consisting of acrylic acid, methacrylic acid, itaconic acid, maleic acid, 2-acrylamido-2-methylpropylsulfonic acid (AMPS), 2-methacrylamido-2-methylpropylsulfonic acid, styrene sulfonic acid, vinylsulfonic acid, ethylene glycol methacrylate phosphate, vinyl phosphonic acid and mixtures thereof.

4. The method of claim 3, wherein said alkylene oxide polymer backbone is a copolymer of ethylene oxide and propylene oxide polymers having a weight ratio from about 45:55 to about 55:45 ethylene oxide to propylene oxide; and
wherein 10% of said repeat units of said alkylene oxide polymer backbone are grafted with said acrylic acid.

5. The method of claim 1, wherein said acid and alkylene oxide derived polymer dispersant has a number average molecular weight from 2,500 Daltons to 12,000 Daltons.

6. A method of inhibiting silica and metal silicate scale formation, said method comprising the steps of:
treating an aqueous system comprising silica and at least one metal ion selected from the group consisting of $Fe^{3+}$ and $Al^{3+}$, with an effective amount of a mixture of a chelating agent and an acid and alkylene oxide derived polymer dispersant wherein
said chelating agent is ethylenediaminetetraacetic acid (EDTA) or diethylene triamine pentaacetic acid (DTPA);
wherein said acid and alkylene oxide derived polymer dispersant has a number average molecular weight from 500 Daltons to 40,000 Daltons;
wherein said chelating agent is mixed with said acid and alkylene oxide derived polymer dispersant in a weight ratio from greater than 1.0:3.0 to less than 1.0:0.5 agent to dispersant; and
wherein said acid and alkylene oxide derived polymer dispersant is a bottle brush polymer comprising side chains A, backbone B, and optionally side chains C;
wherein each A is the unit obtained after the polymerization of one or more anionic monomers selected from the group consisting of carboxylic acid, carboxylate, sulfonic acid, sulfonate, acrylic phosphate, and mixtures thereof;
wherein B is the unit obtained after the polymerization of one or more polyoxoalkylene-containing monomers having the chemical formula:

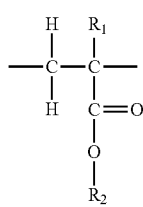

wherein R1 is H or CH3;
wherein R2 has the chemical formula:

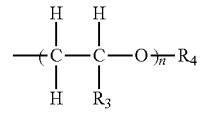

wherein R3 is H, CH3, or mixtures thereof;
wherein R4 is H, or a C1 through C4 alkyl group, or mixtures thereof;
wherein n=5-100;
wherein each C is either: (1) the unit obtained after the polymerization of one or more anionic monomers selected from the group consisting of carboxylic acid, carboxylate, sulfonic acid, sulfonate, acrylic phosphate, and mixtures thereof; or (2) the unit obtained after the polymerization of one or more nonionic monomers selected from the group consisting of methacrylates, acrylates, and acrylamides;
wherein A comprises approximately 5 wt. % to approximately 45 wt. % of the bottle brush polymer;
wherein B comprises approximately 55 wt. % to approximately 95 wt. % of the bottle brush polymer; and
wherein C comprises approximately 0 wt. % to approximately 25 wt. % of the bottle brush polymer.

7. The method of claim 6, wherein A is selected from the group consisting of acrylic acid, the salt of acrylic acid, methacrylic acid, the salt of methacrylic acid, itaconic acid, the salt of itaconic acid, maleic acid, the salt of maleic acid, 2-acrylamido-2-methylpropylsulfonic acid (AMPS), the salt of AMPS, 2-methacrylamido-2-methylpropylsulfonic acid, the salt of 2-methacrylamido-2-methylpropylsulfonic acid, styrene sulfonic acid, the salt of styrene sulfonic acid, vinylsulfonic acid, the salt of vinylsulfonic acid, ethylene glycol methacrylate phosphate, and mixtures thereof;
wherein B is selected from the group consisting of polyoxoalkylene acrylates, methacrylates, polyethylene glycol methacrylate, polyethylene glycol acrylate, polyethylene glycol methyl ether methacrylate, polyethylene glycol methyl ether acrylate, and mixtures thereof; and
wherein C is present and is selected from the group consisting of methyl methacrylate, ethyl acrylate, hydroxy ethyl methacrylate hydroxy propyl acrylate and cellosolve acrylate, (meth)acrylamide, N-methyl acrylamide, N,N-dimethylacrylamide, N-isopropyl acrylamide, N-t-butyl acrylamide, N,N-dimethylaminoethyl (meth)acrylate, t-butyl acrylamide, t-octyl acrylamide, dimethylacrylamide, and mixtures thereof.

8. The method of claim 7, wherein A is said methacrylic acid and is from 5 wt. % to 10 wt. % of the bottle brush polymer;
wherein B is said polyethylene glycol methyl ether methacrylate and is from 70 wt. % to 75 wt. % of the bottle brush polymer; and
wherein C is said methyl methacrylate and is from 20 wt. % to 23 wt. % of the bottle brush polymer.

9. The method of claim 7, wherein A is said acrylic acid and is from 8 wt. % to 10 wt. % of the bottle brush polymer;
wherein B is said polyethylene glycol methyl ether methacrylate and is from 80 wt. % to 84 wt. % of the bottle brush polymer; and wherein C is said methacrylic acid and is from 8 wt. % to 10 wt. % of the bottle brush polymer.

* * * * *